No. 857,691. PATENTED JUNE 25, 1907.
H. P. TOWNSEND.
SYSTEM LOCK.
APPLICATION FILED APR. 1, 1905.
2 SHEETS—SHEET 1.
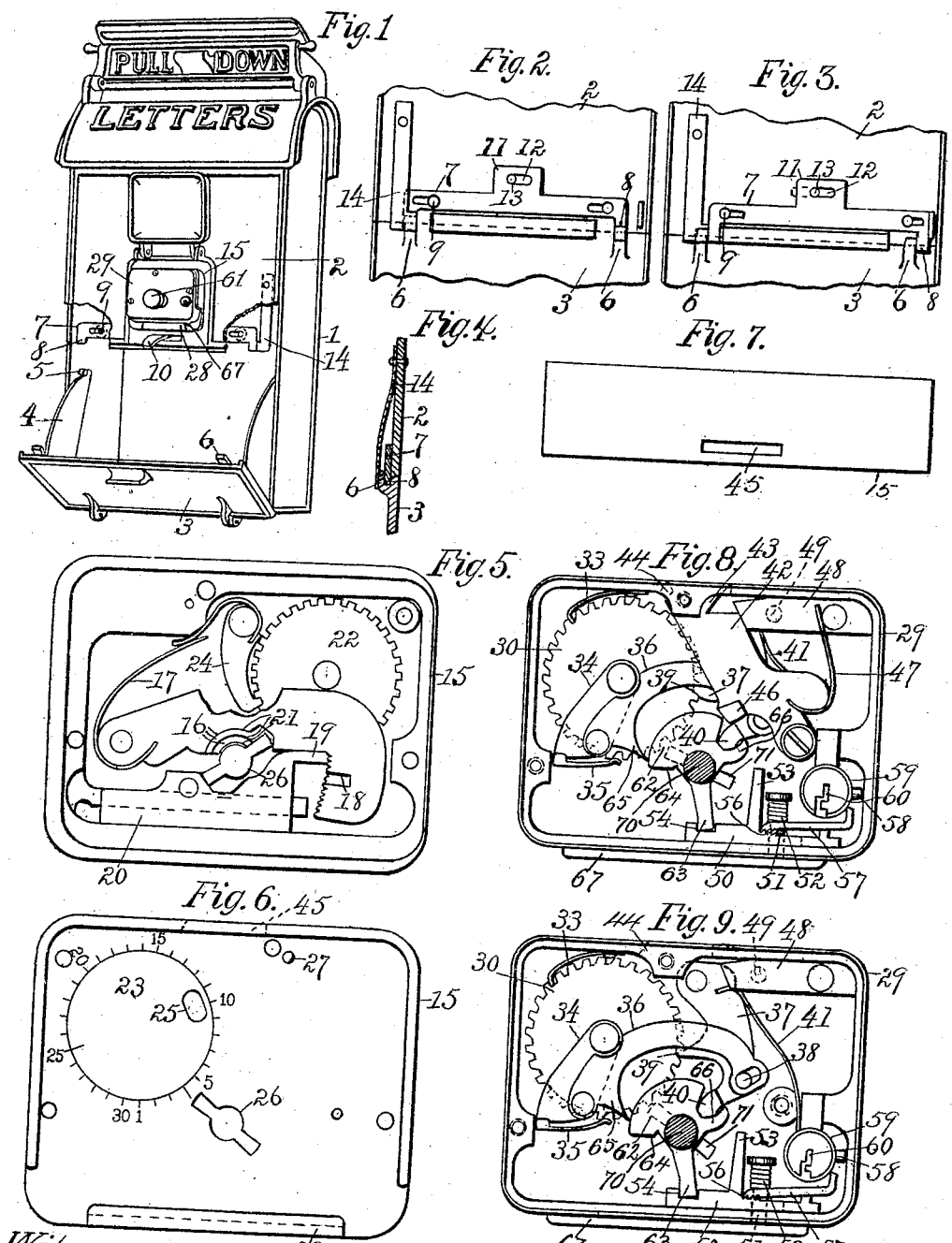

No. 857,691.
PATENTED JUNE 25, 1907.
H. P. TOWNSEND.
SYSTEM LOCK.
APPLICATION FILED APR. 1, 1905.
2 SHEETS—SHEET 2.
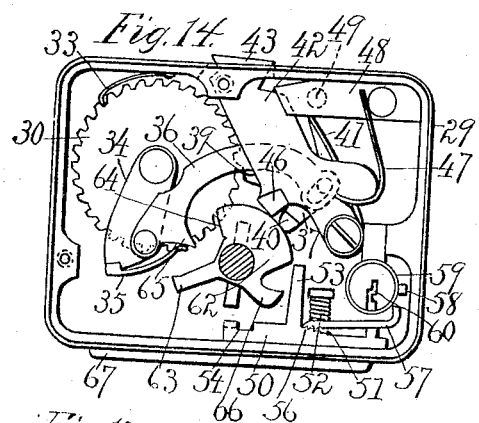
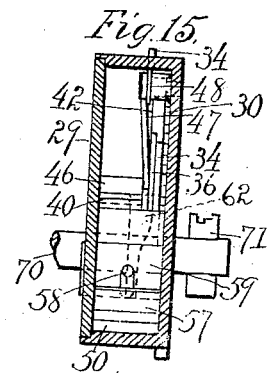
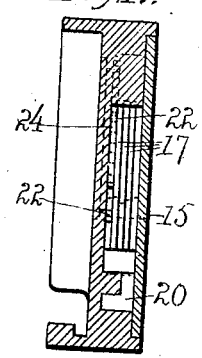
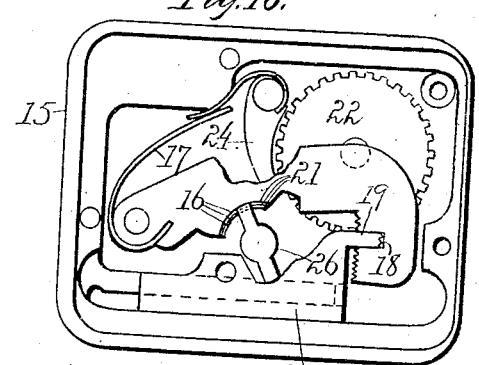
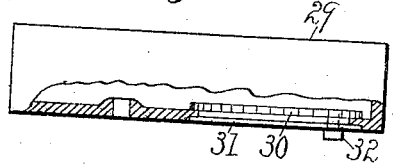
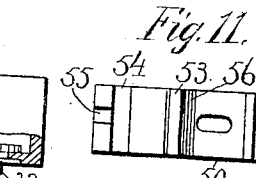
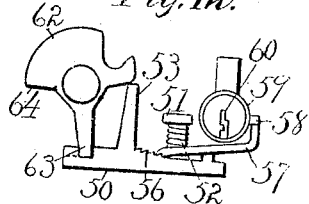
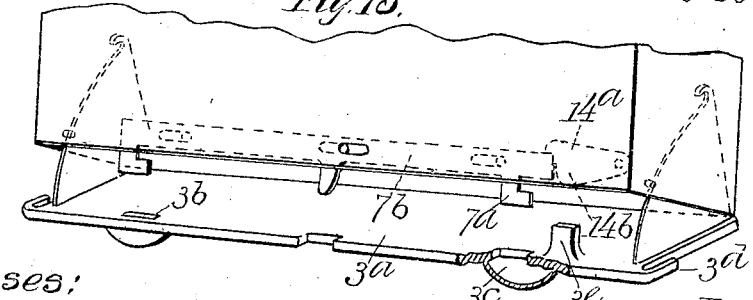
Witnesses:
F. H. Elliott
L. E. Berkowitz
Inventor:
Harry P. Townsend
by Arthur B. Jenkins,
Attorney.
THE NORRIS PETERS CO., WASHINGTON, D. C.

UNITED STATES PATENT OFFICE.

HARRY P. TOWNSEND, OF NEW BRITAIN, CONNECTICUT, ASSIGNOR TO THE AMERICAN SERIAL LOCK COMPANY, OF HARTFORD, CONNECTICUT, A CORPORATION OF CONNECTICUT.

SYSTEM-LOCK.

No. 857,691.  Specification of Letters Patent.  Patented June 25, 1907.

Application filed April 1, 1905. Serial No. 253,338.

*To all whom it may concern:*

Be it known that I, HARRY P. TOWNSEND, a citizen of the United States, and a resident of New Britain, in the county of Hartford and State of Connecticut, have invented a new and Improved System-Lock of which the following is a specification.

My invention relates especially to that class of devices that are located for the reception of mail matter and from which such matter is collected for delivery at its proper destination.

The object of my invention is to provide a device of this class that shall be extremely simple in construction and operation, comparatively few as to its number of parts, and not liable to be easily deranged or injured so as to be inoperative; and a further object of the invention is to provide a device which shall insure the collection of the mail from boxes in a predetermined order or sequence and hence to insure the collection of the mail from all of the receptacles; and a further object of the device is to provide means, that, while insuring the collection of the mail as above noted shall enable it to be collected in a most expeditious manner and with the least possible annoyance or trouble. And a further object of the invention is to provide a lock having means whereby any tampering therewith will be disclosed.

A further object of the invention is to provide means for insuring the closing of the box after mail has been collected therefrom.

A form of device in the use of which these objects may be attained is illustrated in the accompanying drawings, in which—

Figure 1 is a perspective view of a mail box embodying my invention, the box being open and parts broken away to show the position of the bolt in its unlocked location. Fig. 2 is a view of the back of the lower edge of the front plate and upper edge of the door showing the bolt in its locked position. Fig. 3 is a similar view but showing the bolt in the same position as in Fig. 1, that is, unlocked. Fig. 4 is a detail view in cross section through the lower edge of the front plate and upper edge of the door showing the bolt in position to lock the parts. Fig. 5 is a detail view looking into the lock from the rear. Fig. 6 is a front view of the same. Fig. 7 is a top view of the controller. Fig. 8 is a face view looking into the controller and showing the mechanism therein. Fig. 9 is a similar view but showing the key locking lever removed. Fig. 10 is a detail edge view of the controller with parts broken away to show construction. Fig. 11 is a detail plan view of the key block. Fig. 12 is a detail view in elevation of the key block and appurtenant parts. Fig. 13 is a view of the bottom part of a mail box showing a modified form of construction, the lock being removed. Fig. 14 is a detail view similar to Fig. 8 but showing the parts in the position occupied when the controller is locked in position and the letter-box is open. Fig. 15 is a detail end view showing the mechanism in the controller case, the end of the controller being broken away. Fig. 16 is a view similar to Fig. 5 showing the position occupied by the parts when the controller is locked in place and the letter-box is open. Fig. 17 is a detail end view of the lock case and mechanism, the end of the case being broken away to show construction.

While my invention as herein described and claimed is primarily intended for use in connection with, and is especially applicable to, mail boxes, it is understood that the invention may find ready adaptation to receptacles provided for various uses and from which collections are to be made.

In the accompanying drawings the numeral 1 indicates the letter box as a whole having the usual means for allowing the deposit of mail therein, these being preferably located at the top. This box may be constructed of any suitable material and in any desired form and arranged to be secured in proper position for the deposit of mail therein.

The numeral 2 denotes the front plate and 3 the door covering the opening through which access is had for collecting the mail from the box. The opening into the box through which the mail is collected or removed from the box is located between the lower edge of the front plate 2 and the bottom of the box, this opening being preferably on the front. The door is hinged preferably at the bottom of the box in a manner to open outward and downward and is provided with wings 4 to prevent the mail from passing off the end of the door. These wings may be provided with shoulders to engage stops 5 to limit the outward swinging movement of the door.

6 indicates locking lugs projecting upward at the upper edge from the inner face of the door.

A keeper bolt 7 is located on the inner face of the front plate 2 and is provided at each end with a nose 8 arranged, when the bolt is in a certain position, to engage the lugs 6 and hold the door 3 closed. The bolt 7 is provided with slots arranged lengthwise thereof, through which pass screws 9 to secure the bolt to the front plate 2 in such manner as to allow it to have free sliding movement on said plate. A handle 10 is secured to the keeper and projects through an opening in the box, this handle serving as a means for moving the keeper 7, that is also provided intermediate its ends and preferably in an upward extension 11 with a slot 12 for the reception of a pin 13 from a lock bolt to be hereinafter described. A spring stop 14 is secured to the inner surface of the box and projects downward in position to lie in the path of movement of the keeper 7 and it also lies in the path of movement of one of the locking lugs 6. The spring action of this stop is such as to cause it to lie in the path of movement of the keeper whenever the latter is moved to position to unlock the door 3. As shown in Fig. 1 the stop 14 is shown as resting against the end of the keeper 7, the movement of the lugs 6 as the door 3 is opened allowing said stop to spring to position in front of the keeper.

In Figs. 2 and 3 the lugs 6 are shown as located back of the stop 14, as the device is viewed in said figures, and in Fig. 4 the position occupied by the parts in Figs. 2 and 3 is clearly shown, the stop being forced backward by contact of the lugs 6, the stop lying out of line with the keeper 7.

A lock case 15 is secured to the front of the box, as shown in Fig. 1 of the drawings. This case has on one side a chamber for containing the lock mechanism, and on the opposite side, or what may be termed the front, a recess adapted to receive the controller. The lock mechanism located in the chamber in what may be termed the rear of the case consists of a number of tumblers 16, three being shown in the drawings herein. These tumblers are suitably pivoted within the chamber, and tumbler springs 17 hold the tumblers in a predetermined position. Each of the tumblers 16 is provided with a recess 18 for the reception of a lip 19 on the bolt 20. Each of the tumblers is provided with a key engaging surface 21, this surface on each of the tumblers being differently located with respect to the key from the surface on the other tumblers. The springs 17 hold the tumblers normally with the recesses 18 out of line with the lip 19, but when the engaging surfaces 21 are engaged by the bit on the key the tumblers are all raised so that the recesses register and the lip 19, as the bolt 20 is thrown by the rotary movement of the key, enters the recesses; that is, the key places the tumblers in proper position so that the bolt may be thrown by the turning movement of the key. The pin 13 is secured to this bolt and projects through a slot in the wall of the lock and box into the interior thereof and into the slot 12 in the keeper 7. The tumbler mechanism just described is of ordinary construction.

A toothed wheel 22 is pivoted within the case, the pivot extending through the case and having secured thereto a dial 23 as shown in Fig. 6. A spring-retained pawl 24 is employed to hold the toothed wheel in any position of adjustment.

The dial or governor 23 has a dial recess 25 for the reception of a dial pin, to be hereinafter described, located on the controller. The position of this dial recess with respect to the dial pin determines whether the controller may be operated to unlock the box. It is therefore necessary that the position of this recess may be conveniently changed for various purposes, and the pawl 24 in its engagement with the teeth on the edge of the wheel 22 affords a convenient and ready means of changing the position of the lock dial 23.

A key-hole 26 is formed through the front wall of the case 15, and a safety stop actuating pin 27 projects from the face of the case for a purpose to be hereinafter described. The case is provided on the top and ends with walls to closely fit the controller, and a grooved lip 28 projects from the front wall of the case for the reception of a flange on the controller.

The numeral 29 indicates the case of the controller in which the controller mechanism is located. This mechanism includes a dial ratchet wheel 30 and a dial 31 secured to rotate together, the former located within the case and the latter outside the case. This dial is provided with a pin 32 adapted to engage within the dial recess 25 in the dial 23. A retaining pawl 33 is secured to the inner wall of the case and has its free end in engagement with the teeth on the dial ratchet wheel. A pawl supporting arm 34 is preferably pivoted on the support for the dial ratchet wheel 30. This arm projects across the face of the dial ratchet wheel beyond the edge thereof and supports a pawl 35. This pawl is preferably a spring pawl, its free end engaging with the teeth on the dial ratchet wheel 30 in such manner as to force it forward when the pawl supporting arm 34 is moved in that direction. A link 36 connects the pawl supporting arm 34 with the dial locking lever 37. The link has a slot engaging a link pin 38 on the dial locking lever 37, so that the latter has a certain movement independently of said link. The dial locking lever 37 is pivotally supported on the case and has a tooth 39 projecting in position to engage the teeth of the dial ratchet wheel 30 and lock the dial against movement. The dial locking lever 37 also has a key locking stud 40 projecting outward from the lever in position to engage a recess on a cam plate forming a part of the key to be hereinafter described.

A spring 41 is secured to engage the locking lever 37 and hold it normally with the dial locking tooth in engagement with the teeth of the dial ratchet wheel.

A key locking lever 42 is pivoted to a stud projecting outward from the back wall of the case, this lever lying in front of the dial locking lever 37 as shown in Fig. 8 of the drawings. It has on its free end a controller locking bolt 43 projecting into a recess 44 in the controller case 29 and adapted to be projected into the bolt socket 45 in the top projecting wall of the lock case 15. A safety stud 46 projects outward from the locking lever 42 in position to engage the cam plate on the key hereinafter described, the object of this stud being to prevent accidental rotation of the key and also the locating of a pass in a key block, to be hereinafter described, by a method known as "feeling out." A spring 47 is in engagement with the locking lever 42 to hold it normally with the safety stud 46 in engagement with the cam plate on the key. A safety stop 48 is secured to the back wall of the case, this being preferably a spring stop, that is, the stop is constructed of spring metal so that it normally assumes a position to lock the key locking lever 42. Its free end lies in position to engage the edge of said lever, and a releasing stud 49 projects from the rear of the safety stop into a hole in the case in position to be engaged by the safety stop actuating pin 27 as the controller is placed in position within the projecting walls of the lock case. A key block 50 is secured to one of the side walls of the case as by means of a stud 51 projecting through a slot in the key block, a spring 52 holding the block in yielding engagement with the wall of the case. A key stop 53 projects from the key block 50 in position to engage, with the block in a certain position, a cam plate 62 on the key. The key block has a blocking groove 54 extending across the block, and a releasing groove 55 extending from the blocking groove out at the end of the block. The key block 50 has also teeth 56 formed on its flat surface for engagement of a pivoted dog 57 to be engaged by a stud 58 projecting from a setting device 59. This setting device consists preferably of an ordinary cylinder tumbler lock, the stud 58 projecting from the barrel of the lock. It will thus be seen that the dog 57 can be raised only by the insertion of a key in the key slot 60 of the barrel of the setting device, but by using a key the barrel may be readily turned to cause the stud to engage the dog and free it from the toothed surface of the key block.

The key 70 projects into the controller case and is secured thereto in such manner that while it is permitted certain longitudinal and rotary movements it can not ordinarily be removed from the controller but forms a permanent part thereof. This key is provided with a knob 61 for turning the key and on the opposite end are bits 71 for operating the tumblers 16 and the bolt 20 of the lock mechanism.

Within the controller case a cam plate 62 is secured to the shank of the key 70, this cam plate having a key block operating arm 63 projecting into the blocking groove 54 in the key block. This arm is of a thickness to closely fit the releasing groove 55 but to allow it free movement through said groove. A cam 64 is located to engage a cam projection 65 on the link 36 to cause said link to be certainly thrown backward. A hook 66 from the cam plate 62 passes around the dial locking stud 40 on the dial locking lever 37 and prevents it from being moved, as by a jar, to release the locking tooth 39 from engagement with the teeth of the dial 31 whereby said dial might be moved.

The operation of the device is as follows. The letter carrier, or the person to collect the mail, is provided with a controller which he carries with him and which enables him to collect the mail from the several mail boxes on his route, but which also compels him to collect the mail from these boxes in a regular predetermined sequence. The controller is placed on the box from which the mail may be collected, the flange 67 from the bottom of the controller case 29 engaging the grooved lip 28 in the lock case 15. The controller is placed with its rear wall lying close against the front wall of the lock case and within the projecting bottom and end walls of the latter. As it is placed in this position the safety stop actuating pin 27 encounters the end of the releasing stud 49 on the safety stop 48 and entering the recess in which said stud is located, presses the stop forward beyond the outer surface of the key locking lever 42, so that the latter may now be swung on its pivot. The controller being held in this position with its rear wall close against the front wall of the lock case, the key 70 is now pushed inward until the bits 71 on the end thereof have passed through the key hole 26 in the lock case and are located therein. This longitudinal movement of the key is arrested at a time when the bits have just been located within the case 15 with their edges lying close against the front and back walls of the case. A turning movement of the key now causes the tumblers 16 to be moved so that the tumbler recesses 18 register and the bolt 20, in this turning movement of the key, is thrown so that the lip 19 enters said recesses and the pin 13 moves along the slot 12 in the keeper 7. This turning movement of the key 70, by engagement of the cam on the cam plate 62 with the safety stud 46 on the key locking lever 42, swings said lever on its pivot and causes the controller locking bolt 43 to pass through the recess 44 into the bolt socket 45 in the upper projecting wall of the lock case 15. It will now be seen that the controller is locked in place by the bolt on the key locking lever and by the bits 71 on the end of the key 70. This turning movement of the key has also caused the cam plate 62 thereon to engage the dial locking stud 40 on the dial locking lever 37, moving said lever to disengage the dial locking tooth 39 from the teeth on the ratchet wheel 30. In this movement the link pin 38 moves in the slot in the link without operating the link until the tooth 39 has been disengaged from the teeth on the ratchet wheel. As soon as said tooth has been disengaged, however, the pin engaging the opposite end of the slot causes the link 36 to be moved and the pawl supporting arm 34 to be swung, the engagement of the pawl 35 with the teeth on the dial moving said dial a one tooth space. Movement of the dial to this extent is permitted for the reason that the dial pin 32 has engaged with what may be termed the rear end of the dial recess 25 in the dial 23, the dial pin 32 moving to the opposite end of said dial recess. This pin is now in position to engage the front end of the recess in the dial of the lock in the next letter box from which mail is to be collected.

It will be noted that the longitudinal movement of the key 70 inward and with the bits 71 located in the lock as hereinbefore stated, is prevented, as by contact of a shoulder on the key with a wall of the lock case, at a time when the key block operating arm 63 is located opposite the releasing groove 55 so that said arm may pass freely out of the locking groove 54 through the releasing groove 55. It will be noted that in this turning movement of the key 70 the bolt 20 and the lock mechanism have been operated independently of the keeper 7. This is of especial advantage for the reason that with the construction described comparatively little force is required to operate the lock mechanism, as the engagement of the pin 13 in the slot in the keeper 7 allows the bolt 20 to be moved independently of said keeper. The keeper 7 being in engagement with lugs on the door 3 pressure of mail matter within the box upon this door would require considerable force to move the keeper and more than could be readily applied through the knob 61.

In the rotation of the key 70 above described and the movement of the pin 13 along the slot 12 in the keeper 7 the latter has been freed so that it may be moved independently of the locking mechanism. This is now accomplished as by means of the handle 10, the lugs 6 being disengaged from the noses 8 on the keeper, and the door 3 readily opened. As the door is opened the lugs 6 move away from the spring stop 14 which springs into position in the line of movement of the keeper as plainly shown in Fig. 1 and prevents backward movement thereof or movement to lock the box. In this movement of the door 3 the lugs move away from the observer as shown in Figs. 2 and 3 toward the observer, as shown in Fig. 1, and to the right as shown in Fig. 4. It will now be seen that the locking mechanism can not be operated to free the controller from the lock case for the reason that the pin 13 is in such engagement with that end of the slot 12 in the keeper as to prevent backward movement of the key 70, and the keeper 7 being held against movement rotation of the key is absolutely prevented and can only be had when the door is closed and the spring stop 14 moved out of the path of movement of the keeper 7. In this disengaging movement of the spring stop in closing the door said stop moves away from the observer, as shown in Fig. 1, toward the observer as shown in Figs. 2 and 3, and to the left as shown in Fig. 4. This prevents the letter carrier from inadvertently leaving the box before closing and locking it. The mail now being removed from the box the door must be closed, as before described, and this closing movement presses the spring stop 14 backward into the box as above described so that the keeper 7 may now be thrown. The key is then operated and a bit 71 in engagement with the bolt 20 moves the latter backward freeing the tumblers and allowing them to assume their normal position. The pin 13 in this backward movement of the key engages with the slot 12 in the keeper 7, moving it backward, but it will be noted that there is but comparatively little resistance to the movement of the keeper in this direction, as the mail has all been removed from the box and there is no pressure upon the door 3. This backward movement of the key also releases the key locking lever 42 that, under the pressure of the spring 47, moves the bolt 43 from engagement with the recess 45 in the lock case, the safety stop 48 springing backward into position, as the controller is removed from the lock case, to prevent further movement of the key locking lever. In the backward movement of the key when the bits are in position to register with the key hole 26 in the lock the key is moved into its normal position with the bits located in the controller. This movement of the key may be insured, if desired, by a spring suitably connected with the key. When the key is moved back into the controller the latter may be removed from the lock case and the letter carrier passes on to the next box and repeats the operation.

It will be noted that the dial 31 can be moved only by the proper operation of the key, and that therefore the collection of the mail from boxes in a predetermined order must be made. The engagement of the tooth 39 with the dial ratchet wheel 30 and the engagement of the stud 40 with the key, which is held from turning movement, prevents the release of the tooth 39 as by a sudden blow or jar on the case. The key can not be inadvertently turned for the reason that the engagement of the cam plate 62 with the safety stud 46 prevents such operation. If an attempt to turn the key to move the dial forward shall be made without the controller in place on a lock or dummy the following difficulty will be met with. It will be noted that by the construction of the arm 63 on the cam plate 62 to closely fit the releasing groove 55, the key must be located exactly in position to allow said arm to pass along said groove out of the blocking groove 54. It can not be ascertained by "feeling" when said arm is opposite the releasing groove for the reason that the cam is continually in engagement with the safety stud 46 presenting at all times a solid abutment for said cam. If an instrument be inserted to push the safety stud 48 backward and release it from the key locking lever and then the key moved longitudinally and rotated, it will be noted that without the gages afforded when the controller is in place on a lock it will be practically impossible to locate the arm opposite the releasing groove 55 before turning movement shall be given to the key. If turning movement shall be given to the key before said arm is opposite the releasing groove the engagement of the arm with the sides of the blocking groove 54 will cause the key block 50 to be moved, the slot therein permitting such movement. The dog 57 will prevent backward movement of the key block and the projection or key stop 53 will prevent movement of the cam on the key in its direction, and the engagement of the arm 63 with the blocking groove will prevent backward movement of the key 70. The key will thus be locked in a position with the bits outside of the controller case and it can be released from this position only by the operation of the setting device 59, the key of which may be held by a designated person at the place where the mail is ordinarily delivered. It will thus be seen that if an attempt is made to move the dials so that the collection from certain boxes may be omitted that such an attempt is almost sure to be detected from the fact that the key will be so blocked as to prevent its movement and this fact must be disclosed before the controller can be set to permit the operation of the key.

It will be noted that the locking lever 42 can not be moved until the controller case is firmly seated in position, and that the key 70 can not therefore be turned until such case is firmly seated. This prevents any accidental rotation of the key and consequent inadvertent operation of the key block 50, as when the controller case is firmly seated the gage to determine the longitudinal movement of the key will be operative to allow free turning movement of the key for actuation of the key block 50.

In devices heretofore constructed the means for unlocking the mail box has been secured to the mail bag, the mechanism including means for unlocking both the bag and the box. Such a construction, however, is objectionable for the reason that it delays and hinders the postman in the discharge of his duties. An important and essential feature of my invention resides in a self-contained controller which, while necessitating the collection of the mail from boxes in a predetermined order, yet leaves each of the boxes free of access by the collector, and at the same time prevents any chance for leaving the box open. This controller is carried by the postman and constitutes a ready and convenient means for collecting the mail in the manner described.

In Fig. 13 the door 3ª opens downward and has openings 3ᵇ through each of which a nose 7ª on the keeper bolt 7ᵇ extends, the nose engaging the under surface of the cover within a recess 3ᶜ and holding the cover in place. The keeper bolt is engaged by the lock mechanism the same as in the devices hereinbefore described, and is provided with hooks 3ᵈ at opposite ends of which a mail bag may be hung, as by means of rings secured thereto. The stop 14ª consists of a pivoted piece engaging the end of the bolt and held in an engaging position preferably by gravity. The lower edge 14ᵇ of said stop lies in the path of movement of a lug 3ᵉ on the inner face of a door that, as the door is closed engages the stop and lifts it from the path of movement of the keeper bolt.

What I claim as my invention and desire to secure by Letters Patent is:—

1. In a collecting device, a receiver, lock mechanism for the receiver including a governor, a self-contained controller including an index wheel to register with said governor, operating mechanism located within the controller and including a key permanently secured thereto but movable to operate the mechanism of the receiver lock and of the controller.

2. A receiver having lock mechanism including a governor, a self-contained controller having an index to register with the governor, means for locking the controller to the receiver, operating mechanism for the controller including a key permanently secured thereto but movable to operate both the lock mechanism and the controller mechanism.

3. A receiver, a door therefor, lock mechanism for said door, a self-contained controller having mechanism, and a key secured to the controller but movable to engage the lock mechanism of the receiver and having a different movement to operate the mechanisms of both the controller and the receiver.

4. A receiver, a door therefor, lock mechanism for said door, a self-contained controller having operating mechanism including a lock to secure the controller to the receiver, and a key permanently secured to the controller but movable to engage said lock mechanism and having a different movement to operate the mechanisms of both the receiver and controller.

5. A receiver, a door therefor, lock mechanism for said door, a self-contained controller, a key permanently secured to the controller, and arranged to operate said lock mechanism means for locating the key in its normal working position, and a guard operated by the movement of the key in its abnormal position.

6. A receiver, a door therefor, lock mechanism for said door, a self-contained controller having operating mechanism, a key movable to engage and operate said lock mechanism and the controller mechanism, means for preventing rotation of the key except in its working position, and means to lock said key against turning movement when located out of its proper position.

7. A receiver, a door for the receiver, lock mechanism for said door, a self-contained controller having operating mechanism including means for locking the controller to the receiver, a key movable to engage and operate both of said mechanisms, means for preventing rotation of the key except when in proper position, and means to lock said key in its turning movement when located out of its proper position.

8. A receiver, a door therefor, lock mechanism for said door and including a lock case having a grooved lip, a controller having a flange to engage said lip, operating mechanism located in the controller and including means for locking the controller to said lock case, and a single key for operating the mechanism of the said lock and of said controller.

9. A receiver, a door therefor, lock mechanism including a lock case having a grooved lip and a governor, a controller having a flange to engage said grooved lip, and operating mechanism including an index to engage said governor, and means for locking the controller to said case, and a key for operating the mechanism in the controller and in the lock case.

10. A receiver, a door therefor, lock mechanism for said door including a lock case, a self-contained controller having mechanism including a lock for securing it to the lock case, and a key permanently secured to the controller but movable to operate the mechanism of both the controller and the lock.

11. A receiver, a door therefor, lock mechanism for said door, said mechanism including a bolt, means for moving the bolt independently of the lock mechanism, and means for operating it by the movement of the lock mechanism.

12. A receiver, a door therefor, lock mechanism for said door, said mechanism including a bolt, means for moving the bolt independently of the lock mechanism to unlock the door, and means for moving the bolt in the opposite direction by the movement of the lock mechanism.

13. A receiver, a door therefor, lock mechanism for said door and including a bolt, means for moving the bolt in one direction independently of the lock mechanism, and means for manually operating the lock mechanism to move the bolt in the opposite direction.

14. A receiver, a door therefor, lock mechanism for said door, including a bolt movable independently of the lock mechanism, in one direction, means for imparting said independent movement to the bolt, and a controller for operating said lock mechanism to move the bolt in the opposite direction.

15. A receiver, a door therefor, lock mechanism for said door including a bolt independently movable in one direction independently of said lock mechanism, means for imparting said independent movement to the bolt, a controller having operating mechanism for securing it to said lock, and means appurtenant to the controller for operating the mechanism thereof and for operating the lock mechanism to move said bolt in the opposite direction.

16. A receiver, a door therefor, lock mechanism including a governor and a bolt movable independently of the lock mechanism, means for imparting said independent movement to the bolt, a controller having mechanism including means to lock it to the receiver and an index to register with the governor, and means for operating the mechanism of the controller and of the lock.

17. A receiver, a door therefor, a bolt located on the inner surface of the receiver to lock said door, a lock case located outside of the receiver and having mechanism connected with said bolt, the latter having a movement independently of its operating mechanism, means for moving said bolt in one direction independently of the lock mechanism, and means for operating the lock mechanism to move the bolt in the opposite direction.

18. A receiver, a door therefor, a bolt located on the inner wall thereof to lock said door, a lock case secured to the outer surface of the receiver and having mechanism connected with said bolt which has movement in one direction independently of said mechanism, means for manually moving the bolt independently of its operating mechanism, means outside of the receiver for operating the lock mechanism, and a stop to lock the bolt against sliding movement.

19. A receiver, a door therefor, a bolt located on the inner surface of the receiver to lock the door, a lock case secured to the outer surface of the receiver and having lock mechanism connected with said bolt and including a governor, said bolt having movement independently of the lock mechanism, a controller to be secured to said lock case and having an index to register with said governor, and means for simultaneously operating the mechanism of both the controller and the lock.

20. A receiver, a door therefor, a sliding bolt located on the inner surface of the receiver to lock said door, a lock case secured to the outer surface of the receiver and having lock mechanism connected with said bolt which has a movement independently of said lock mechanism, a stop to hold the bolt against movement in the open position of the door, means operated by the movement of the door for removing said stop as the door is closed, and means for moving said bolt.

21. A receiver, a door therefor, a sliding bolt located on the inner surface of the receiver, a spring stop to hold the bolt against movement, a locking lug on the door to be engaged by a nose on the bolt, said lug operating to remove the stop from the path of movement of the bolt, said bolt having a movement independently of its lock mechanism, a lock case secured to the outer surface of the receiver and having mechanism connected with the bolt, and means for operating the mechanism of the lock case.

22. A receiver, a door therefor having a locking lug, a bolt located on the inner surface of the receiver and having a nose to engage said locking lug, a stop to prevent sliding movement of the bolt and located in the path of movement of said lug, said bolt having a movement independently of the locking mechanism, means for imparting such independent movement to said bolt, a lock case secured to the outer surface of the receiver and having mechanism in engagement with said bolt, and a controller to be attached to the case and having means for operating the mechanism therein.

23. A receiver, a door therefor having a locking lug, a sliding bolt located on the inner surface of the receiver and having a nose to engage said lug, said bolt also having a movement independently of its lock mechanism, a stop to prevent sliding movement of the bolt and located in the path of movement of said lug, means for imparting independent movement to the bolt, a lock case having mechanism connected with said bolt and including a governor, a controller to be attached to said lock case, and having an index to engage said governor, and means located on the controller for operating the mechanism of both the controller and the lock case.

24. A receiver, a door therefor, lock mechanism for said door including a bolt, means for connecting the bolt with the remainder of the lock mechanism and including a pin upon one part engaging a slot upon the opposite part whereby the bolt has an unlocking sliding movement independently of the rest of the lock mechanism, means for causing said unlocking sliding movement, and means for manually operating the lock mechanism to impart locking movement to the bolt.

25. A receiver, a door therefor, lock mechanism for said door, a controller to be attached to said receiver, a key for operating the controller and door lock mechanism, and means for preventing turning movement of the key to operate said mechanism until the controller is accurately seated.

26. A receiver, a door therefor, lock mechanism for said door, a controller to be secured to the receiver, a bolt included in the controller mechanism, a single means for operating both the controller and door lock mechanism, and means for preventing movement of said bolt until the controller has been accurately seated.

27. A receiver, a door therefor, lock mechanism for said door, a controller to be removably secured to the receiver and having mechanism including a bolt for locking the controller to the receiver, a stop to prevent movement of said bolt, and means for removing said stop from the path of movement of the bolt.

28. A controller for collection devices including operating mechanism, a bolt included in said mechanism for locking the controller in place, a key permanently secured to the controller for operating its mechanism, and means for preventing movement of said bolt until the controller has been accurately seated.

29. A controller for collection devices including a case, operating mechanism located within the case, a registering index included in said mechanism, means for moving said index, means for locking said index against movement, and means for operating the lock to release the index before pressure applied to rotate the latter.

30. A controller for collection devices including a case, mechanism located therein, a registering index included in said mechanism, a lock for said index, means for rotating said index, a key for operating said mechanism, and connections between the key and means for moving the index and lock for releasing the latter before operation of the former.

31. A controller for collection devices including a case, operating mechanism located therein, a registering index included in the mechanism, a lock for said index, means for moving the index, a key for operating said mechanism, and a stop for said lock released only in the turning movement of the key to operate the mechanism.

32. A controller for collection devices including a case, operating mechanism located within said case and including a registering index, means for moving said index, a lock for said index, a key for operating said mechanism, and connections between said index, lock and the key for operating the index only in the movement of the lock.

33. A controller for collection devices including a case, operating mechanism located within said case, a registering index included in said mechanism, means for moving said index, a lock for said index, a key for operating said mechanism, and connections between said key and lock for preventing movement of the latter only in the movement of the key, and for removing said lock before power applied to rotate the index.

34. A receiver, lock mechanism therefor, a controller, controller mechanism located within the controller, a key for operating said mechanism, a key block for said key, means for positioning said key to permit rotative movement thereof without obstruction by the key block, and means for preventing rotation of the key until the controller is properly seated.

35. A receiver, lock mechanism therefor, a controller, controller mechanism located therein, a key for operating said mechanism, a key block for said key, means normally preventing rotation of said key when out of position to pass said block, and means for preventing rotation of the key until the controller is properly seated.

36. A receiver, lock mechanism therefor, a controller, controller mechanism located therein, a key for operating said mechanism, a block for said key, means for positioning said key to permit rotative movement thereof without obstruction by said key block, and means for preventing rotative movement of said key until in proper position to freely pass said block.

37. A receiver, lock mechanism therefor, a controller, controller mechanism therein, a key for said mechanism, a key block to permit independent rotative movement of the key only with the receiver in proper position, and means for preventing rotative movement of the key until in proper position to freely pass the key block.

38. In a controller for collection devices, a key, a key block for preventing independent movement of the key until in proper position to pass said block, and a safety stud resting against said key when in proper position to freely pass said block.

39. In a controller for collection devices, a key, a block for preventing independent rotative movement of the key until in proper position to pass said block, a safety stud resting against said key when in proper position to pass said block, and means for preventing movement of said safety stud until the controller is in a predetermined position.

40. A receiver, lock mechanism therefor, a controller, mechanism therefor including a locking lever to secure it to the receiver, a key for operating the mechanisms, a block to prevent independent rotative movement of the key until in proper position, a safety stud resting against the key when in position to freely pass said block, a safety stop to prevent rotative movement of the key, and means for removing said stop when the controller is in proper position.

41. A receiver, lock mechanism therefor, a controller, mechanism therefor including a locking lever to secure it to the receiver, a key for operating said mechanisms, a key block to prevent independent rotative movement of the key until in proper position, a safety stud located on the locking lever and resting against the key when the key is in proper position to pass said block, a safety stop to prevent rotative movement of the key, and means for removing said stop when the controller is placed in proper position.

42. In a controller for collection devices, an index dial, a dial locking lever for said index, a key for operating said parts, a key block to prevent independent rotative movement of the key until in position to pass said block, and a safety stud in engagement with the key when in position to pass said block.

43. In a controller for collection devices, an index wheel, a dial locking lever for said wheel, means for rotating said wheel, a key to operate said locking lever and dial rotating means, a block for said key to prevent independent rotative movement of the key until in proper position to pass the block, and a safety stud in contact with the key when in position to pass said block.

44. In a controller for collection devices, an index wheel, a dial locking lever, an arm for rotating said wheel, a link secured to said arm and to said lever to permit independent movement of the latter, a key for operating said parts, a key block to prevent rotative movement independently of the key until the key is in proper position, and a safety stop in contact with the key when in proper position to pass the key block.

45. A receiver, a door therefor, a keeper for said door, lock mechanism including a tumbler controlled bolt, for moving said keeper a loose connection between the keeper and bolt permitting movement of the latter independently of the former, and means for operating said keeper.

46. In a controller for collection devices, operating mechanism therefor, a key for said operating mechanism, a block for said key, and a key stop on said block to prevent rotation of the key with the block in its abnormal position.

47. A controller for collection devices, operating mechanism therefor, a key for said operating mechanism, a block for said key, and tumbler operated mechanism to release said block from position to prevent rotation of the key.

48. A controller for collection devices, operating mechanism therefor, a key for said operating mechanism, a block to prevent rotation of said key, a dog for said block, and tumbler operated mechanism to release said dog.

49. A controller for collection devices, operating mechanism therefor, a key for said operating mechanism, a block for said key, and a key operated device connected with said mechanism for releasing said block.

50. A controller for collection devices, operating mechanism therefor, a key for said operating mechanism, a block for said key, a dog to prevent movement of said block, a barrel having a stud to engage said dog, and key and tumbler actuating mechanism for said barrel.

51. A receiver, a self-contained controller, mechanism on the controller and receiver for preparing the former for removable attachment to a designated receiver only, and means for operating said mechanism.

52. A receiver, a controller, mechanism on the receiver and controller for preparing the latter for removable attachment only to a designated receiver, said mechanism also including means for insuring the closure of the receptacle, and means for operating said mechanism.

53. A receiver, a controller, mechanism on the receiver and controller for preparing the latter for removable attachment only to a designated receiver, said mechanism also including means for compelling the closure of the receiver and for attaching the controller to the receiver, and means for operating said mechanism.

54. In a registering mechanism including rotating parts to register one with the other, a toothed member connected with the rotating registering part, and a spring actuated lever engaging said teeth to prevent movement of the registering part whereby adjustment of a rotating part may be effected.

55. A receiver, a door therefor, lock mechanism for said door, a self-contained controller having mechanism, a key secured to the controller but movable to engage and operate the mechanisms of both the controller and the receiver.

56. A receiver, a door therefor, lock mechanism for said door, a self-contained controller having operating mechanism, including a lock to secure the controller to the receiver, a key permanently secured to the controller but movable to operate both the controller mechanism and the lock mechanism.

57. A receiver, a door therefor, lock mechanism for said door including a lock case having a grooved lip, a controller having a flange to engage said lip, operating mechanism located within the controller and including a bolt for locking the controller to the lock case, means on said bolt for preventing rotation of a key, and the key for operating the mechanism of the lock and of the controller.

58. A receiver, a door therefor, lock mechanism appurtenant to said door, said mechanism including a sectional bolt, one section of the bolt for securing the door, said sections having a movement independent each of the other, and means for operating the locking section of the bolt independently of the lock mechanism.

59. A receiver, a door therefor, lock mechanism for said door, a self-contained controller removably engaged with the door and having operating mechanism, a key movable to engage and operate the lock mechanism and the controller mechanism, means for preventing rotation of the key except in its working position, and means to lock said key in its turning movement when located out of its proper position.

60. A receiver, a door therefor, lock mechanism for said door and including a lock case having a grooved lip, a controller having a flange to engage said lip for removable engagement of the controller, operating mechanism located in the controller and including means for locking the controller to said lock case, and a key for operating the mechanism of the lock and of the controller.

61. A receiver, a door therefor, lock mechanism for said door including a lock case, a self-contained controller having mechanism including a lock for removably securing it to the lock case, and a key permanently secured to the controller but movable to operate the mechanism of both the controller and lock.

62. A receiver, a door therefor, lock mechanism for said door and including a bolt manually movable in both directions, means for moving the bolt in one direction independently of the lock mechanism, and means for manually operating the lock mechanism to move the bolt in the opposite direction.

63. A receiver, a door therefor, lock mechanism for said door, a controller to be removably secured to the receiver, a bolt included in the controller mechanism, means for operating both the controller and lock mechanism, and means for preventing movement of said bolt until the controller has been accurately seated.

64. A receiver, a door therefor, lock mechanism for said door, a controller to be removably secured to the receiver and having mechanism including a bolt for locking the controller to the receiver, a stop to prevent movement of said bolt, and means for moving said stop from the path of movement of the bolt in placing the controller in position.

65. A controller for collection devices including operating mechanism, means for removably attaching the controller in place, a bolt included in said attaching mechanism, a key for operating the controller mechanism, and means for preventing turning movement of said key until the controller has been accurately seated, but permitting such movement when the controller is accurately seated.

66. A receiver, a door therefor, lock mechanism for said door, a self-contained controller having operating mechanism, a key secured thereto but movable into the lock to operate the mechanism of both the controller and said lock, means for preventing rotation of the key except in its working position, and means to lock said key against both turning and lengthwise movement when located out of its proper position.

67. A receiver, a door therefor, lock mechanism appurtenant to said door, said mechanism including a sectional bolt, one section of the bolt for securing the door and the other section controlled by tumblers of the lock mechanism, said bolt sections having a movement independent each of the other, and means for manually operating the locking section of the bolt independently of the lock mechanism to unfasten the door.

68. A receiver, a door therefor, lock mechanism for said door, a self-contained controller having operating mechanism, a key movable to engage and simultaneously operate said lock mechanism and the controller mechanism, means for preventing rotation of the key except in its working position, and means to lock said key against turning movement when located out of its proper position.

69. A receiver, a door therefor, lock mechanism for said door including a lock case, a self-contained controller having mechanism including a lock for securing it to the lock case, and a key permanently secured to the controller but movable to simultaneously operate the mechanism of both the controller and the lock.

70. A receiver, a door therefor, lock mechanism for said door, a self-contained controller having mechanism, a key secured to the controller but movable to engage and simultaneously operate the mechanism of both the controller and the receiver.

71. A receiver, a door therefor, lock mechanism for said door, a self-contained controller having operating mechanism, including a lock to secure the controller to the receiver, a key permanently secured to the controller but movable to simultaneously operate both the controller mechanism and the lock mechanism.

72. A receiver, a door therefor, lock mechanism for said door including a lock case having a grooved lip, a controller having a flange to engage said lip, operating mechanism located within the controller and including a bolt for locking the controller to the lock case, means on said bolt for preventing rotation of a key, and the key for simultaneously operating the mechanism of the lock and of the controller.

HARRY P. TOWNSEND.

Witnesses:
L. M. BRAMAN,
G. E. ROOT.